United States Patent Office 2,783,151
Patented Feb. 26, 1957

2,783,151
PROCESS FOR PREPARING HARD BUTTER

Walter M. Cochran, Highland Park, and Melvin L. Ott, Chicago, Ill., assignors to The Glidden Company, Cleveland, Ohio, a corporation of Ohio No Drawing. Application June 11, 1954,
Serial No. 436,224

6 Claims. (Cl. 99—118)

This invention relates to an improved process for preparing hard butters from mixtures of oils, said process being characterized by the use of a dual treatment involving both interesterification (rearrangement) of the mixed oils and replacement of lower fatty acids by higher fatty acids.

The Barsky Patent No. 2,182,332 entitled "Method for Reconstructing Glyceride Oils" discloses a replacement process in which lower fatty acid radicals of glyceride oils are first displaced by higher fatty acid radicals, and the displaced acids and unreacted higher fatty acids are then distilled off.

The Mueller Patent No. 2,585,027 describes another replacement process of similar type but wherein the free fatty acids remaining at the conclusion of the replacement treatment are esterified with added glycerine.

We have now found that such and other replacement processes can be applied effectively before or after the rearrangement of oils and fats to prepare improved hard butters.

In the copending application of Cochran and McGee, Serial No. 279,824, filed April 1, 1952, now Patent Number 2,726,158, issued December 6, 1955, there is disclosed a rearrangement process for preparing hard butters from a wide variety of mixed oils. It is there disclosed that when the iodine value of the rearranged product is below about 20, the product exhibits the characteristics of hard butter if the distribution of kinds and amounts of fatty acids corresponding to the fatty radicals contained in the triglycerides of the product are within certain prescribed limits. One of those prescribed limitations is that the $C_6$ to $C_{10}$ fatty acids must individually be not greater than 10% of the total and must not aggregate in toto more than 15%. We have now found that these limitations need not necessarily be met in the mixture of oils which is to be rearranged, since after the rearrangement has been completed, the content of $C_6$–$C_{10}$ fatty acid radicals can be lowered to any desired value by subjecting the rearranged oil to a replacement treatment with higher fatty acids, thereby introducing appropriate amounts of higher fatty acids individually or in admixture to bring the finished fat within the hard butter range. We have also found that iodine values up to 20 can have less softening action than a like value in hard butters otherwise meeting the limitations prescribed in said copending application, especially when such iodine value represents unsaturation which is confined to fatty acid radicals having an even number of carbon atoms greater than 12 and is accompanied by not more than 6% $C_6$–$C_{10}$ fatty acid radicals in the triglycerides constituting the hard butter. For example, unsaturation due solely to oleic acid radicals in the triglycerides of the oil can attain an iodine value of 20 in the hard butter if the $C_6$–$C_{10}$ acids are displaced in sufficient quantity to leave not more than about 6% of them in the hard butter. For this purpose and others, their displacement by conventional methods can either precede or follow the rearrangement.

We have also found that any rearranged triglyceride fat having the characteristics of hard butter and containing $C_6$–$C_{10}$ fatty acid radicals can be altered without removing it from the hard butter category of fats by subjecting it to a replacement treatment of the type disclosed in the Barsky patent, supra, so as to replace the $C_6$–$C_{10}$ and other fatty acid radicals thereof either wholly or partially with higher, even-numbered fatty acid radicals. Such alteration can be effected for a variety of purposes, so as to improve its snap, to increase its hardness, melting or setting point, etc.

Accordingly, it is an object of this invention to prepare hard butters by rearranging mixtures of natural and/or corresponding synthetic glyceride oils and subsequently subjecting the rearranged mass of glycerides to replacement esterification.

It is a further object to improve rearranged hard butters by subjecting them to a replacement esterification treatment either before or after the rearrangement.

It is another object to convert rearranged masses of non-hard-butter triglycerides into hard butters by subjecting said masses to a replacement esterification treatment.

A further object is to prepare rearranged hard butters having iodine values up to 20 and having less than about 6 percent of $C_6$–$C_{10}$ fatty acids.

The copending application Serial No. 279,824, supra, describes the preparation of rearranged hard butters derived from mixtures of triglyceride oils composed of the following kinds and amounts of combined fatty acids:

| | Percent |
|---|---|
| $C_6$ acids | 0–10 |
| $C_8$ acids | 0–10 |
| $C_{10}$ acids | 0–10 |
| $C_6 + C_8 + C_{10}$ acids | 0–15 |
| $C_{20}$ and higher acids | 0–8 |
| $C_{12}$–$C_{18}$ acids inc | remainder |

The saturated acids corresponding to the $C_{12}$–$C_{18}$ acid radicals of said remainder should be in the following percentages by weight on said remainder, and the $C_{12}$ and $C_{14}$ radicals should be within the ratios indicated:

| | |
|---|---|
| $C_{12} + C_{14}$ | 37.5%–80%. |
| $C_{16}$ acids | 5%–28%. |
| $C_{18}$ acids | 15%–47.5%. |
| $C_{12}/C_{14}$ | Between 2:1 and 3.1:1. |

It will be apparent that such ultimate analysis can be obtained prior to rearrangement by mixing various glyceride oils together and, if necessary, subjecting the mixture to a replacement treatment in which the lower acids are reduced in quantity while higher acids are increased.

We have also found that it is not necessary to have the above ultimate analysis in the mixture prior to rearrangement, provided that analysis can be reached by subjecting the rearranged mass to a subsequent replacement esterificatin treatment. Thus the rearranged mixture may not have the attributes of a hard butter, but after the replacement treatment has been completed, the ultimate analysis conforms to the above requirements and the mass then exhibits hard butter characteristics. The following examples illustrate such two-step processes for preparing hard butters.

Example 1

This example illustrates the rearrangement of 10% of domestic oil stearine with coconut oil, and then the replacement of a portion of the combined fatty acids of the rearranged mass with 10% of stearic acid. Ninety parts of refined, bleached coconut oil was hydrogenated to an iodine value of 0.54 and was mixed with ten parts of cottonseed stearine of an iodine value of 0.62. The resulting mixture had a setting point of 40.2° C. This mixture was then rearranged by heating at 220° F. with 0.25% sodium methoxide and the treated mass cooled and washed three times with water. The resulting rearranged mixture had a setting point of 30.2° C. and a saponification value of 248.4. Ninety parts of this rearranged mass and ten parts of stearic acid were then heated together to 525-540° F. for two hours. At the end of this time free fatty acids were distilled to give a product containing 1.54% free fatty acids. The product obtained was caustic refined, bleached and deodorized and was judged to be useful as a hard butter. This fat had a Wiley melting point of 99° F., a setting point of 33.1° C. and a saponification value of 240.8.

*Example 2*

Eighty parts of refined bleached coconut oil was hydrogenated to an iodine value of 0.54 and was mixed with 20 parts of cottonseed stearine of an iodine value of 0.62. The resulting mixture had a setting point of 45.2° C. This mixture was then rearranged by heating to 220° F. under a vacuum of 8 mm. and adding 0.30% sodium methoxide. The treated mass was cooled to 160° F. and washed three times with water and had a setting point of 33.1° C. and had a saponification value of 239.8. Ninety parts of this rearranged mass and ten parts of stearic acid were then heated together to 540° F. for three hours. At the end of this time free fatty acids were distilled to give a product containing 1.62% free fatty acids. This product was caustic refined, bleached and deodorized and had a Wiley melting point of 106.5° F., a setting point of 36.2° C., a saponification value of 234.0 and an iodine value of 0.7.

*Example 3*

Fifty parts of refined coconut oil and fifty parts of refined cottonseed oil were rearranged under vacuum by treating with 0.15% sodium methoxide for fifteen minutes at 190° F. The resulting product was cooled to 160° F. and washed three times with ten percent by volume of water. The rearranged product was bleached and hydrogenated to a 95° F. Wiley melting point. Eighty-five parts of the above product mixed with fifteen parts of stearic acid were heated to 550° F. for two and one-half hours under a blanket of nitrogen. At the end of this time free fatty acids were distilled to give a product containing 1.74% free fatty acids. This product was caustic refined, bleached and deodorized and had a Wiley melting point of 110.0° F., a setting point of 35.6° C., and an iodine value of 20.8. The finished product had a Wiley melting point of 110° F., acceptable "snap" and good eating characteristics, and gave edible coatings having a good initial gloss and good gloss-retention properties. The saponification value of the finished product was 219.6, thereby having been lowered 4.8 units by the whole treatment. The introduction of hard fats, as here, is to impart gloss-retention to rearranged hard butters while reducing the amount of replaceable lower fatty acids.

*Example 4*

70 parts coconut oil and 30 parts cottonseed oil (sap. No. 233.1) were rearranged with sodium methoxide at 220° F. and then hydrogenated to 90° F. Wiley melting point followed by replacement with 15% stearic acid to a final product having the following characteristics:

| | |
|---|---|
| Wiley melting point, ° F | 105 |
| Set point | 34.6 |
| Iodine value | 13.7 |
| Saponification No | 227.4 |

*Example 5*

Eighty-five parts coconut oil and 15 parts cottonseed (sap. No. 243.5) oil were rearranged with sodium methoxide at 220° F. and then hydrogenated to 85° Wiley melting point. This was followed by replacement with 15% stearic acid in the manner described in the preceding examples to give a finished fat having the following hard butter properties:

| | |
|---|---|
| Wiley melting point, ° F | 98.0 |
| Set point | 32.2 |
| Iodine value | 10.9 |
| Saponification No | 233.6 |

*Example 6*

Seventy-one parts of coconut stearine and twenty-nine parts of cottonseed stearine were mixed together and the mixture was rearranged in glass under vacuum by treating with 0.15% sodium methoxide for twenty minutes at 220° F. The resulting mixture was cooled to 160° F. and washed three times with 10 percent by volume of water. The original blend had a Wiley melting point of 129.5° F. and after rearrangement a Wiley melting point of 106.5° F. This material was subjected to a replacement treatment by heating ninety parts thereof with ten parts of oleic acid at 540° F. for two hours under nitrogen. At the end of this time free fatty acids were distilled off to give a product containing 3.15% free fatty acid. This product was caustic refined, bleached and deodorized to the following hard butter:

| | Before replacement | After replacement |
|---|---|---|
| Sap. No | 233.1 | 225.8 |
| I. V | 0.54 | 9.8 |
| W. M. P., °F | 106.5 | 104.0 |

*Example 7*

Seventy-one parts of coconut stearine and 29 parts of cottonseed stearine were rearranged as in Example 6 to a Wiley melting point of 106.5° F. and then was subjected to replacement with 20% oleic acid. The replacement was conducted as in Example 6, and yielded a product having free fatty acids of 7.37%. The product was refined, bleached and deodorized to provide hard butter.

| | Before replacement | After replacement |
|---|---|---|
| Sap. No | 233.1 | 224.4 |
| Iodine value | 0.54 | 16.0 |
| Wiley melting point, °F | 106.5 | 101.0 |
| Setting point, °C | | 31.9 |

NOTE.—As the $C_{14}$ component of the base to be replaced is increased, it becomes more difficult to effect a replacement of the lower fatty acids.

Following are examples of products prepared by replacement followed by low-temperature rearrangement.

*Example 8*

Ninety parts coconut oil (I. V. 9.3, sap. No. 255.6) and ten parts of stearic acid were heated together to 530° F. under nitrogen for three hours. At the end of the reaction period free fatty acids were distilled to give a product containing 1.34% free fatty acid (oleic). This product was caustic refined and bleached. One-half of the above was hydrogenated to a product of the following constants:

| | |
|---|---|
| Iodine value | 0.62 |
| Sap. No | 247.5 |
| Setting point, ° C | 31.6 |
| Wiley melting point, ° F | 104.0 |

One-half of the above product was rearranged with 0.25% sodium methoxide, refined, bleached and deodorized to the following:

| | |
|---|---|
| Setting point, ° C | 31.7 |
| Wiley M. P., ° F | 93.5 |

The other half of this material was treated as follows:

40 parts replaced coconut oil as prepared above
30 parts 76° coconut oil
30 parts cottonseed oil These were rearranged (.2% sodium methoxide at 220° F.) and hydrogenated to the following product:

| | |
|---|---|
| Wiley melting point, ° F | 98.5 |
| Setting point, ° C | 32.8 |
| Iodine value | 9.4 |
| Sap. No | 233.4 |

*Example 9*

Eighty-eight parts of coconut stearine (I. V. 0.54, sap. No. 256.2) and 12 parts of stearic acid were heated together to 540° F. under nitrogen for three hours. At the end of the reaction period free fatty acids were distilled under vacuum to give a product containing 1.62% free fatty acid (oleic). This product was caustic refined and bleached.

| | |
|---|---|
| Iodine value | 0.66 |
| Sap. No. | 246.0 |
| Setting point, ° C | 34.4 |
| W. P. M., ° F | 109 |

One-half of the above product was rearranged with 0.20% sodium methoxide at 220° F., refined, bleached and deodorized to the following product:

| | |
|---|---|
| Setting point, ° C | 32.4 |
| Wiley M. P., ° F | 98.5 |
| Sap. No. | 234.8 |

The other half of this material was treated as follows:

80 parts replaced coconut oil stearine as prepared above
20 parts cottonseed stearine These were rearranged at 220° F. with .20% sodium methoxide, refined, bleached and deodorized to the following product:

| | |
|---|---|
| Wiley M. P., ° F | 105.0 |
| Setting point, ° C | 35.2 |
| Iodine value | 0.62 |

As indicated above the catalyst is a low temperature rearrangement catalyst such as the alkali metal alkoxides having up to 4 carbon atoms, alkali metal hydrides such as sodium hydride, and numerous others such as are described in the Eckey U. S. Patent No. 2,442,536. Other alkaline compounds such as lithium aluminum hydride and calcium hydride have been found by us to be ineffective as have such known catalysts as aluminum isopropylate.

Small amounts of the low temperature rearrangement catalysts are employed in the treatment, as little as .02% of sodium methoxide by weight on the mixture of glycerides being effective when conditions are such that it is in an active condition. Most of the catalysts induce an exothermic reaction and such exothermicity becomes increasingly difficult to work with as the amount of catalyst is increased. Moreover, losses of glycerides tend to be increased and more saponification tends to occur. For these reasons we avoid the use of more than about 1% of catalyst. We prefer to use between about 0.1% and 0.5% of such active catalysts as sodium methoxide, sodium ethoxide or sodium hydride, and prefer a chemically equivalent percentage of other active low-temperature catalysts.

The catalyst is easily destroyed or inactivated by water, moisture, carbon dioxide and air. Accordingly, in order to provide treating conditions which are favorable to activity on the part of the catalyst, the mixture of triglycerides should be thoroughly dry, and contact with the moisture and carbon dioxide of the air must be prevented. We have found that an inert atmosphere such as hydrogen, nitrogen or vacuum is very effective. When an inert gaseous atmosphere of hydrogen or nitrogen is maintained over the mixture of glycerides, the treatment can be effectively carried out in a loosely-covered container. Preferably, however, the treatment is conducted in a vacuum chamber since by heating the mass to expeditious reaction temperatures in a vacuum of around 0.1 to 0.2 inch of mercury or lower, the glycerides can be dried effectively. Nitrogen can then be introduced for agitation and blanketing purposes to reduce the vacuum to about 1.5 inches gauge pressure. Mechanical agitation can also be used. The container may be of iron, stainless steel, glass or aluminum. However, when aluminum is used, the amount of catalyst must generally be increased.

The catalyst is also destroyed by free acids and by peroxides. Accordingly, the glycerides which are to be treated should have been refined in advance with alkalis or otherwise to reduce the free fatty acid content to about .05% or lower, and to eliminate peroxides as far as possible. It should be understood that the provision of refined triglycerides and of other conditions favorable to the catalyst is done mainly in the interest of economizing the catalyst. The consequence of not making such provisions is simply that the quantity of catalyst which must be introduced to overcome all such unfavorable factors is wasted.

As indicated above, the temperature of the catalytic treatment can be varied over an appreciable range. When solvents are employed, temperatures as low as room temperature have been employed successfully. When the treatment is conducted in the absence of solvents, the temperature should at least be high enough to maintain the mass in the liquid phase throughout the catalytic treatment. The minimum temperature will, of course, then depend on the particular mixture of triglycerides which is being treated. Temperatures as high as 250° F. have been used successfully in vacuum equipment in the absence of solvents, but we prefer to use temperatures around 200°–240° F. in such vacuum equipment as they lead to low losses of material and to the formation of but little soap. Temperatures above about 250° F. are avoided because of catalyst decomposition and because of the exothermicity of the reaction and the disadvantageous results attendant thereon, as mentioned above.

The effectiveness of the catalyst and of the treatment can be determined by the changed physical properties of the mass, but we have also found that it is easily determined by the color of the mass of glycerides. The color of the mass changes from its original color to a reddish-brown color when the rearrangement reactions have been completed. If no such color change is observed within a few minutes after the catalyst has been added, it signifies that something has deactivated the catalyst. Frequently the initial addition of the catalyst almost cures the difficulty, and the rearrangement will be found to occur on the further addition of a small quantity of catalyst. Likewise, when only a slight color change is observed, it may signify that the catalyst was initially active but was soon inactivated. A further addition of catalyst will then cause the reaction to go to completion. We have observed that the rearrangement reaction goes to completion in the space of a few minutes if sufficient active catalyst is present. The addition of more catalyst under such conditions produces no further change, nor does holding the mass for a prolonged period of time cause any material change.

After the catalytically-induced rearrangement reaction has been completed, the mass can be cooled sufficiently to permit it to be washed with water or dilute acids so as to decompose the catalyst. Such washing is preferably done at temperatures around 170°–180° F. since there is little tendency at such temperatures for an emulsion to be formed. The washed material can then be stratified and the water separated from the mass of treated oil. The oil can then be dried by applying vacuum with or without further heating. The drying operation can, of course, be done in any of the other ways well known to those skilled in the art.

Where the treated glycerides contain unsaturated fatty acid radicals, the treated mass can be hydrogenated by any of the conventional methods in the presence of any suitable hydrogenation catalyst, the treatment being carried on until the unsaturation has been reduced to as low a value as may be desired to provide a finished product having an iodine value of 20 or lower.

Having described our invention, what we claim is:

1. The process of treating a mixture of triglyceride oils to prepare hard butter having an iodine value below about 20, and composed essentially of the following kinds, proportions and ratios of combined fatty acids:

| | |
|---|---|
| $C_6$ acids | 0–10% |
| $C_8$ acids | 0–10% |
| $C_{10}$ acids | 0–10% |
| $C_6+C_8+C_{10}$ acids | 0–15% |
| $C_{20}$ and higher acids | 0–8% |
| $C_{12}$–$C_{18}$ acids, inc. | Remainder |
| Ratio of $C_{12}$ to $C_{14}$ saturated acids corresponding to the $C_{12}$ to $C_{14}$ radicals in the mixture | Between 2:1 and 3.1:1 |
| $C_{12}+C_{14}$ acids | 37.5%–80% of said remainder |
| $C_{16}$ acids | 5%–28% of said remainder |
| $C_{18}$ acids | 15%–47.5% of said remainder | said process comprising the steps of (A) providing a mixture of triglyceride oils (1) having even numbers of carbon atoms in the combined fatty acids thereof (2) having an excess of at least one combined lower fatty acid of 6–10 carbons over at least the lower limit thereon as set forth above and (3) having at least one combined higher fatty acid of 12–18 carbons in an amount below the upper limit thereon as set forth above; (B) rearranging the mixture of oils then at hand while maintaining it in homogeneous liquid phase at temperatures below about 250° F. in contact with a small effective amount less than about 1% of a low temperature rearrangement catalyst under rearrangement conditions favorable to said catalyst until the rearrangement reactions promoted by said catalyst have been substantially completed, and then inactivating said catalyst; (C) treating the mixture of oils then at hand under replacement conditions with higher fatty acid in amounts and kinds at least sufficient to bring the mixture within the limits set forth above, and continuing said replacement treatment with removal of replaced lower fatty acids until the combined fatty acid content of the mass of oil being so treated then falls within the limits set forth above and the mass of oil is substantially free of uncombined higher fatty acids; and (D) hydrogenating the resulting mass of oil, when necessary, to bring its iodine value below about 20 and to reduce any unsaturation in the lower combined fatty acids to below an iodine value of about 6; said steps B and C being taken in any order subsequent to step A and prior to step D.

2. The process as claimed in claim 1 wherein step C follows step B.

3. The process as claimed in claim 2 wherein the low temperature rearrangement catalyst is an alkali metal alkoxide having up to four carbons.

4. The process as claimed in claim 1 wherein step C precedes step B.

5. The process as claimed in claim 4 wherein the low temperature rearrangement catalyst is an alkali metal alkoxide having up to four carbons.

6. The process as claimed in claim 1 where the total content of $C_6$–$C_{10}$ combined fatty acids is below about 6% by weight on the total weight of combined fatty acids.

References Cited in the file of this patent
UNITED STATES PATENTS

| | | |
|---|---|---|
| 2,442,536 | Eckey | June 1, 1948 |
| 2,657,995 | Blum | Nov. 3, 1953 |
| 2,667,418 | Barsky et al. | Jan. 26, 1954 |